US007694699B2

(12) United States Patent
Lim et al.

(10) Patent No.: US 7,694,699 B2
(45) Date of Patent: Apr. 13, 2010

(54) SYSTEM AND METHOD FOR FILLING HYDRODYNAMIC BEARINGS WITH FLUID

(75) Inventors: Tae Hyeong Lim, Gyunggi-do (KR); Dong Kil Son, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 635 days.

(21) Appl. No.: 11/723,149

(22) Filed: Mar. 16, 2007

(65) Prior Publication Data

US 2007/0227616 A1   Oct. 4, 2007

(30) Foreign Application Priority Data

Mar. 16, 2006   (KR) .................. 10-2006-0024362

(51) Int. Cl.
 *B65B 31/00* (2006.01)
 *F16C 32/06* (2006.01)
 *F01M 1/00* (2006.01)
(52) U.S. Cl. .................. 141/59; 141/5; 141/7; 141/65; 384/100; 184/109
(58) Field of Classification Search .............. 141/4, 141/5, 7, 59, 65, 67; 384/100; 184/109
See application file for complete search history.

(56) References Cited

U.S. PATENT DOCUMENTS

| 5,112,142 | A | * | 5/1992 | Titcomb et al. ............. 384/107 |
| 5,601,125 | A | * | 2/1997 | Parsoneault et al. ........... 141/51 |
| 5,778,948 | A | * | 7/1998 | Gomyo et al. ................. 141/7 |
| 5,862,841 | A | * | 1/1999 | Wuester, Sr. ................ 141/284 |
| 6,804,987 | B2 | * | 10/2004 | Kloeppel et al. ............... 73/10 |

(Continued)

FOREIGN PATENT DOCUMENTS

JP   11-040391   2/1999

(Continued)

OTHER PUBLICATIONS

Korean Office Action, dated Feb. 26, 2007, Intellectual Property Office (KIPO).

(Continued)

*Primary Examiner*—Timothy L Maust

(57) ABSTRACT

A system and method for filling hydrodynamic bearings with fluid are disclosed. The fluid filling system of the present invention includes a fluid storage tank to store fluid therein, a vacuum vessel to receive a hydrodynamic bearing therein, a fluid dispenser for connecting the fluid storage tank to the vacuum vessel and dripping the fluid into a micro-gap of the hydrodynamic bearing, a pump connected both to the fluid storage tank and to the vacuum vessel and separately exhausting air from both the fluid storage tank and the vacuum vessel to the outside, and a nitrogen storage tank for separately controlling pressure in both the fluid storage tank and the vacuum vessel, wherein the fluid storage tank is pressurized using nitrogen such that the pressure in the fluid storage tank becomes higher than the pressure in the vacuum vessel, thus causing the fluid to move to the vacuum vessel and to be dripped into the hydrodynamic bearing received in the vacuum vessel. The fluid filling system further includes an ultrasonic generator for applying ultrasonic waves to the fluid storage tank, thus removing air bubbles from the fluid.

15 Claims, 8 Drawing Sheets

U.S. PATENT DOCUMENTS

| | | | |
|---|---|---|---|
| 7,048,444 B2 * | 5/2006 | Kurimura et al. | 384/119 |
| 7,144,160 B2 * | 12/2006 | Kimura | 384/12 |
| 7,344,002 B2 * | 3/2008 | Neumann et al. | 184/5.1 |

FOREIGN PATENT DOCUMENTS

| | | |
|---|---|---|
| JP | 2001-165153 | 6/2001 |
| JP | 2004-54916 | 2/2004 |
| JP | 2004-176796 | 6/2004 |
| JP | 2005-036974 | 2/2005 |
| JP | 2005-114051 | 4/2005 |
| KR | 10-2001-0019932 A | 3/2001 |

OTHER PUBLICATIONS

Chinese Office Action issued on Apr. 14, 2009 in corresponding Chinese Patent Application 2007-065528.

Chinese Office Action dated Jul. 9, 2009 and issued in corresponding Chinese Patent Application 2007100800191.

* cited by examiner

SYSTEM AND METHOD FOR FILLING HYDRODYNAMIC BEARINGS WITH FLUID

CROSS REFERENCE TO RELATED APPLICATIONS

This application claims the benefit of Korean Patent Application No. 10-2006-0024362, filed on Mar. 16, 2006, entitled "System and Method for Filling Fluid into Hydrodynamics Bearings", which is hereby incorporated by reference in its entirety into this application.

BACKGROUND OF THE INVENTION

1. Field of the Invention

The present invention relates, in general, to a system and method for filling hydrodynamic bearings with fluid and, more particularly, to a system and method for filling hydrodynamic bearings with fluid, which can be used to fill the hydrodynamic bearings with fluid without requiring the use of a pumping unit.

2. Description of the Related Art

Generally, hydrodynamic bearings are devices used in motors of Hard Disk Drives or CD-Drives. The hydrodynamic bearing includes a shaft and a sleeve to support the shaft, with a micro-gap defined between the shaft and the sleeve and filled with viscous fluid, such as oil, thus permitting free rotation of the shaft due to dynamic pressure formed in the micro-gap caused by the fluid during relative rotation of the shaft and the sleeve.

During a process of filling the hydrodynamic bearing with fluid, it is necessary to prevent the formation of air bubbles in the micro-gap between the shaft and the sleeve. However, it is very difficult to prevent the formation of air bubbles in the micro-gap during the process of filling the bearing with fluid, and a complicated procedure is required.

A conventional fluid filling method is disclosed in Japanese Patent Laid-open Publication No. 2005-114051, entitled Method for Manufacturing Hydrodynamic Bearings and Motor using the Hydrodynamic Bearings, and is schematically shown in FIG. 4 of the accompanying drawings.

As shown in FIG. 4, a conventional system for filling hydrodynamic bearings 10 with oil comprises an oil tank 210, an air bubble removing means H and S, a vacuum vessel 220 and a needle valve 230.

The oil tank 210 stores oil with which a hydrodynamic bearing 10 is to be filled. The oil tank 210 is connected to a vacuum pump P1 through a pipe having a valve B1, and is connected through a pipe 212 to the needle valve 230 placed in the vacuum vessel 220.

The vacuum pump P1 exhausts air from the interior of the oil tank 210 to the atmosphere until the pressure in the oil tank 210 is reduced to a predetermined vacuum level P1.

The air bubble removing means H and S removes air bubbles from oil stored in the oil tank 210 and comprises a heating unit H and a stirring unit S.

The heating unit H is placed beneath the oil tank 210 and heats the oil to a predetermined temperature, thus removing air bubbles from the oil. The stirring unit S is installed in the oil tank 210 such that the unit S is immersed in the oil inside the oil tank 210. The stirring unit S stirs the oil in the oil tank 210, thus removing air bubbles from the oil.

The vacuum vessel 220 receives the hydrodynamic bearing 10 therein, and is connected to a vacuum pump P2 through a pipe having a valve B2, and communicates with the atmosphere through another pipe having a valve B3.

The vacuum pump P2 exhausts air from the interior of the vacuum vessel 220 until the pressure in the vacuum vessel 220 is reduced to a predetermined vacuum level P2. In the above state, the pressure in the vacuum vessel 220 is reduced such that the vacuum level P2 is lower than the vacuum level P1 of the oil tank 210. Described in detail, the pressure in the oil tank 210 is higher than that in the vacuum vessel 220.

The valve B3 opens the pipe to supply atmospheric air to the vacuum vessel 220, thus the pressure in the vacuum vessel 220 becomes equal to atmospheric pressure.

The needle valve 230, which drips oil onto the hydrodynamic bearing 10, is connected to the oil tank 210 through the pipe 212. The outlet nozzle of the needle valve 230 is located at a position around a tapered seal part 8 of the hydrodynamic bearing 10, thus easily dripping the fluid onto the hydrodynamic bearing 10.

The conventional system for filling hydrodynamic bearings 10 with oil, which has the above-mentioned construction, fills a hydrodynamic bearing 10 with oil while removing air bubbles from the oil, as will be described herein below.

First, the conventional oil filling system removes air bubbles from oil stored in the oil tank 210. The oil stored in the oil tank 210 under atmospheric pressure is heated by the heating unit H and is stirred by the rotating stirring unit S, and thus air bubbles are removed from the oil. At the same time, the pressure in the oil tank 210 is reduced by the vacuum pump P1 to the predetermined vacuum level P1 and is maintained at that vacuum level P1.

Thereafter, the hydrodynamic bearing 10 is received in the vacuum vessel 220, and the pressure in the vacuum vessel 220 is reduced by the vacuum pump P2 to the predetermined vacuum level P2. In the above state, air which remains in the tapered seal part 8 between the shaft and the sleeve of the hydrodynamic bearing 10 is removed in the form of air bubbles. The interior of the tapered seal part 8 is maintained at the vacuum level P2.

Thereafter, oil is dripped onto the tapered seal part 8 of the hydrodynamic bearing 10 due to the difference between the vacuum levels P1 and P2 (P1>P2).

After dripping the oil, the valve B3 is opened to introduce atmospheric air into the vacuum vessel 220, thus gradually returning the internal pressure of the vacuum vessel 220 to atmospheric pressure. In the above state, oil is pressurized by the atmospheric air flowing into the vacuum vessel 220 and is forced into all of the corners of the tapered seal part 8, thus filling the entire tapered seal part 8.

However, the conventional oil filling system and method is problematic in that, in order to drip oil onto the hydrodynamic bearing 10, the respective vacuum levels of the oil tank 210 and the vacuum vessel 220, which are reduced to create an almost perfect vacuum, must be controlled and maintained carefully such that the pressure difference between the oil tank 210 and the vacuum vessel 220 is precisely controlled.

Furthermore, to remove air bubbles from oil stored in the oil tank 210, the conventional system and method requires additional devices, such as the heating unit H and the stirring unit S, thereby complicating the construction of the system.

SUMMARY OF THE INVENTION

Accordingly, the present invention has been made keeping in mind the above problems occurring in the related art, and the object of the present invention is to provide a system and method for filling hydrodynamic bearings with fluid which make it easy to control the pressure difference between a fluid storage tank and a vacuum vessel when dripping fluid onto a hydrodynamic bearing.

Another object of the present invention is to provide a system and method for filling hydrodynamic bearings with fluid, in which, to remove air bubbles from fluid, one vibration generating means capable of vibrating and heating the fluid is used, thus simplifying the construction of the fluid filling system and providing an easy fluid filling process.

In order to achieve the above objects, according to one aspect of the present invention, there is provided a system for filling hydrodynamic bearings with fluid, comprising: means for storing filling material therein; means for receiving therein an object to be filled with the filling material, the receiving means being connected to the storing means to allow the filling material to move; means for separately exhausting air from both the storing means and the receiving means to an outside; and means for separately controlling pressure in both the storing means and the receiving means, wherein the storing means is pressurized such that pressure in the storing means becomes higher than pressure in the receiving means, thus causing the filling material to move to the object received in the receiving means and to drip into the object.

In the system, the pressure controlling means may supply nitrogen into both the storing means and the receiving means, thus controlling pressure in both the storing means and the receiving means.

The system may further comprise: means for applying vibrations to the storing means, thus removing air bubbles from the filling material.

According to an embodiment, the present invention provides a system for filling hydrodynamic bearings with fluid, comprising: a fluid storage tank for storing fluid therein; a vacuum vessel for receiving a hydrodynamic bearing therein; a fluid dispenser for connecting the fluid storage tank to the vacuum vessel and dripping the fluid into a micro-gap of the hydrodynamic bearing; a pump connected both to the fluid storage tank and to the vacuum vessel and separately exhausting air from both the fluid storage tank and the vacuum vessel to an outside; and a nitrogen storage tank for separately controlling pressure in both the fluid storage tank and the vacuum vessel, wherein the fluid storage tank is pressurized using nitrogen such that the pressure in the fluid storage tank becomes higher than the pressure in the vacuum vessel, thus causing the fluid to move to the vacuum vessel and to drip into the hydrodynamic bearing received in the vacuum vessel.

The system may further comprise: an ultrasonic generator for applying ultrasonic waves to the fluid storage tank, thus removing air bubbles from the fluid.

In the system, the pump may be connected to both the fluid storage tank and the vacuum vessel through respective air exhaust pipes, with a throttle valve provided on each of the air exhaust pipes to open or close the air exhaust pipe.

In the system, the nitrogen storage tank may be connected to both the fluid storage tank and the vacuum vessel through respective nitrogen supply pipes, with a throttle valve provided on each of the nitrogen supply pipes to open or close the nitrogen supply pipe.

In the system, the fluid dripped into the hydrodynamic bearing may be pressurized by the nitrogen supplied from the nitrogen storage tank, thus being charged in the micro-gap of the hydrodynamic bearing.

In another aspect, the present invention provides a method for filling hydrodynamic bearings with fluid, comprising the steps of: (A) exhausting air from a fluid storage tank using a pump; (B) putting a hydrodynamic bearing into a vacuum vessel and exhausting air from the vacuum vessel using the pump; (C) supplying nitrogen into the fluid storage tank such that the pressure in the fluid storage tank becomes higher than the pressure in the vacuum vessel; (D) moving the fluid from the fluid storage tank to the hydrodynamic bearing using the high pressure in the fluid storage tank and dripping the fluid onto the hydrodynamic bearing; and (E) supplying nitrogen into the vacuum vessel, thus pressurizing the dripped fluid and filling the hydrodynamic bearing with the fluid.

In the method, the fluid may be vibrated when the air is exhausted at the step (A), so that air bubbles can be exhausted from the fluid.

In the method, part of the fluid which has been dripped onto the hydrodynamic bearing at the step (D) may permeate through a micro-gap of the hydrodynamic bearing due to capillary action, while a remaining part of the dripped fluid may permeate through the micro-gap when the fluid is pressurized by the nitrogen at the step (E).

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
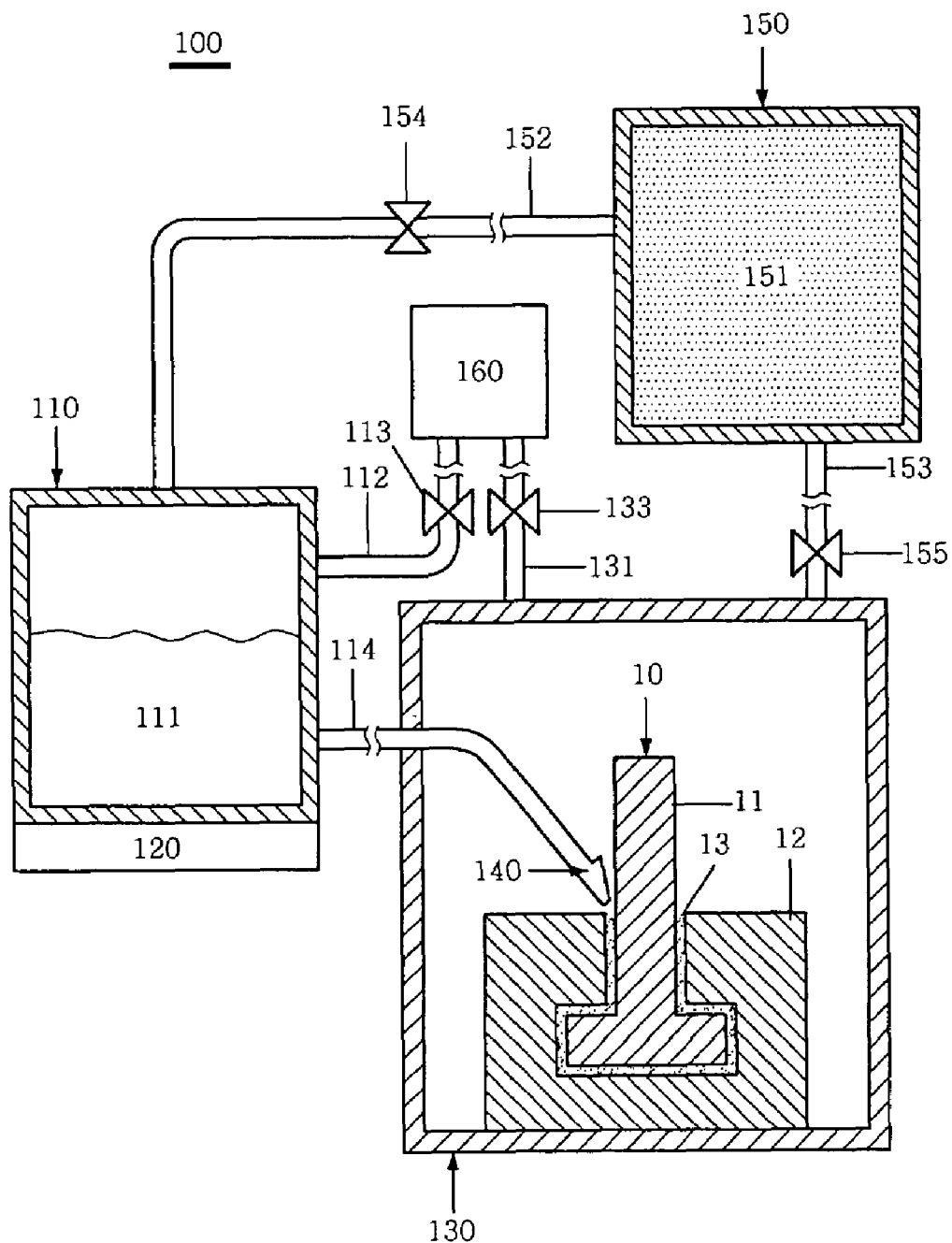
FIG. 1 is a schematic view illustrating a system for filling hydrodynamic bearings with fluid according to a preferred embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Hereinbelow, a fluid filling system 100 according to an embodiment of the present invention will be described in detail with reference to FIG. 1. For ease of description, only a shaft 11 and a sleeve 12 of a hydrodynamic bearing 10 are shown in detail in the drawing, while the other elements of the bearing 10 are not shown in detail, but are shown schematically. Furthermore, the micro-gap 13 between the shaft 11 and the sleeve 12 is shown very exaggeratedly, unlike its actual shape and size.

As shown in FIG. 1, the fluid filling system 100 comprises a fluid storage tank 110, an ultrasonic generator 120, a vacuum vessel 130, a fluid dispenser 140 and a nitrogen storage tank 150.

The fluid storage tank 110 stores therein fluid 111 to be charged in the hydrodynamic bearing 10, with a fluid inlet port (not shown) formed in a predetermined part, preferably, the upper part of the fluid storage tank 110, thus supplying fluid into the fluid storage tank 110.

Further, the fluid storage tank 110 is connected both to a pump 160, which exhausts air from the tank 110, and to the nitrogen storage tank 150, which supplies nitrogen to the fluid storage tank 110. The pump 160 is hermetically connected to the fluid storage tank 110 through an air exhaust pipe 112, with a throttle valve 113 mounted on the air exhaust pipe 112 to open or close the pipe 112.

The fluid storage tank 110 is also connected to the vacuum vessel 130, which receives the hydrodynamic bearing 10 therein. In the above state, the vacuum vessel 130 is hermetically connected to the fluid storage tank 110 through a fluid supply pipe 114 which is connected to the fluid dispenser 140.

The ultrasonic generator 120 applies ultrasonic waves having predetermined frequencies to the fluid storage tank 110, thus removing air bubbles from the fluid 111 inside the fluid storage tank 110. In the above state, the ultrasonic generator 120 applies ultrasonic signals produced by an electronic circuit to an ultrasonic vibrator, such as a piezoelectric ceramic, thus generating vibrations and producing ultrasonic waves.

When the ultrasonic waves produced by the ultrasonic generator 120 are transmitted to the fluid 111, the temperature of the fluid 111 is increased, and thus cavities are repeatedly formed in the fluid 111 and eliminated from the fluid 111. Due to the above-mentioned formation and elimination of the cavities in the fluid 111, the fluid 111 vibrates, and thus air bubbles therein are eliminated.

The vacuum vessel 130 receives therein the hydrodynamic bearing 10 to fill the bearing 10 with fluid 111. An opening (not shown) is defined in a predetermined part, preferably, the upper part of the vacuum vessel 130, thus allowing a worker to put the bearing 10 into the vessel 130 or take it out.

Furthermore, the pump 160 for exhausting air from the vacuum vessel 130 and the nitrogen storage tank 150 for storing and supplying nitrogen to the vessel 130 are connected to respective portions of the vacuum vessel 130. The pump 160 is hermetically connected to the vacuum vessel 130 through an air exhaust pipe 131, with a throttle valve 133 mounted on the air exhaust pipe 131 to open or close the pipe 131.

The fluid dispenser 140 for dripping fluid 111 into the micro-gap 13 of the hydrodynamic bearing 10 is connected to one end of the fluid supply pipe 114. The outlet nozzle of the fluid dispenser 140 is located at a position around the micro-gap 13 between the shaft 11 and the sleeve 12 of the hydrodynamic bearing 10, and thus it can easily drip the fluid into the micro-gap 13.

The nitrogen storage tank 150, which controls pressure both in the fluid storage tank 110 and in the vacuum vessel 130, is connected both to the fluid storage tank 110 and to the vacuum vessel 130 through respective nitrogen supply pipes 152 and 153. The nitrogen storage tank 150 stores therein nitrogen 151, having a pressure higher than atmospheric pressure, and supplies the nitrogen 151 both to the fluid storage tank 110 and to the vacuum vessel 130 by opening respective throttle valves 154 and 155 mounted on the nitrogen supply pipes 152 and 153.

The method for filling the hydrodynamic bearing with fluid using the fluid filling system 100 while removing air bubbles from the fluid will be described in detail with reference to FIGS. 2 and 3A through 3E.

Figure 2:
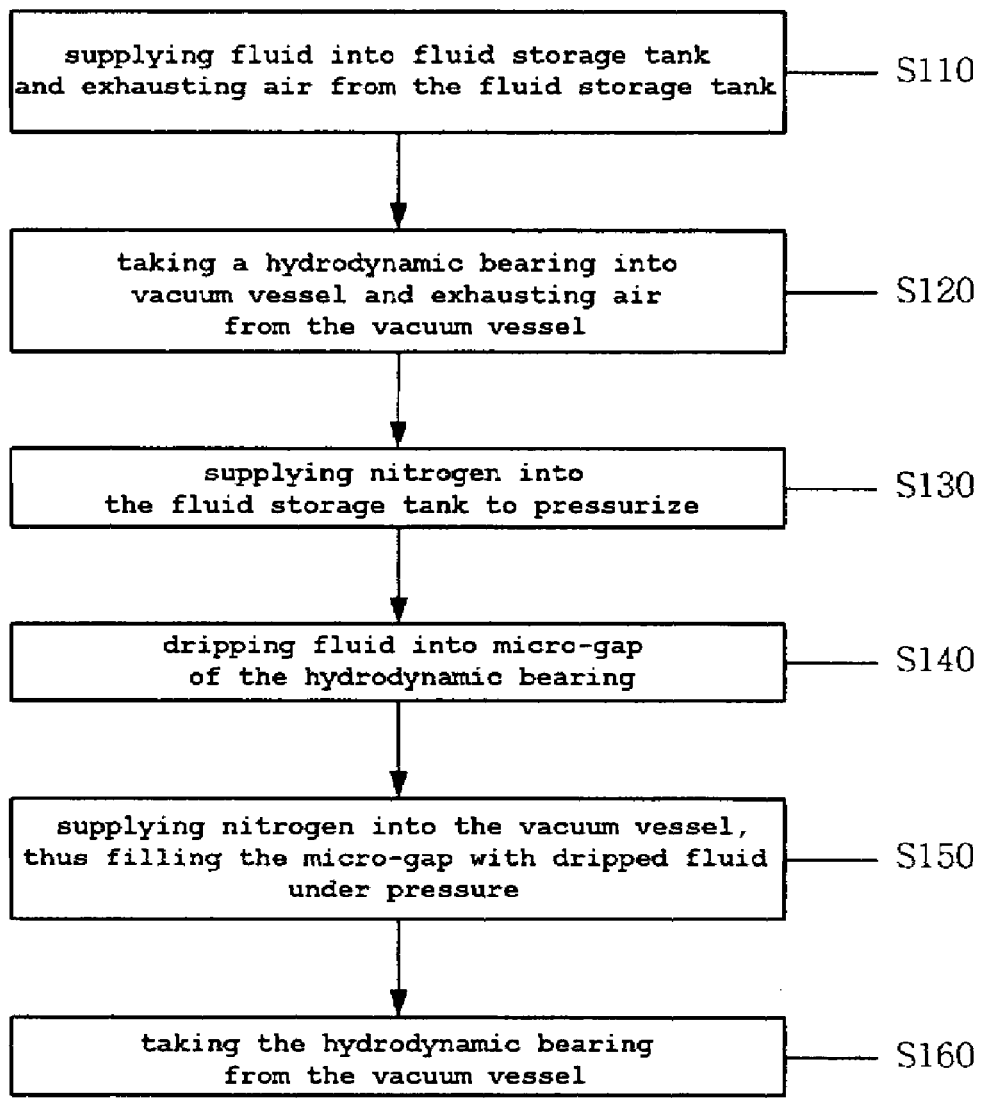
FIG. 2 is a flowchart of a method for filling a hydrodynamic bearing with fluid using the fluid filling system of FIG. 1.

As described in the flowchart of FIG. 2, the fluid filling method of the present invention comprises six steps.

Described in detail, the fluid filling method according to the present invention comprises a first step S110 of supplying fluid into the fluid storage tank and exhausting air from the fluid storage tank, a second step S120 of taking a hydrodynamic bearing into the vacuum vessel and exhausting air from the vacuum vessel, a third step S130 of supplying nitrogen into the fluid storage tank, a fourth step S140 of dripping fluid into the micro-gap of the hydrodynamic bearing, a fifth step S150 of supplying nitrogen into the vacuum vessel, thus filling the micro-gap with dripped fluid under pressure, and a sixth step S160 of taking the hydrodynamic bearing filled with the fluid from the vacuum vessel.

Figure 3A:
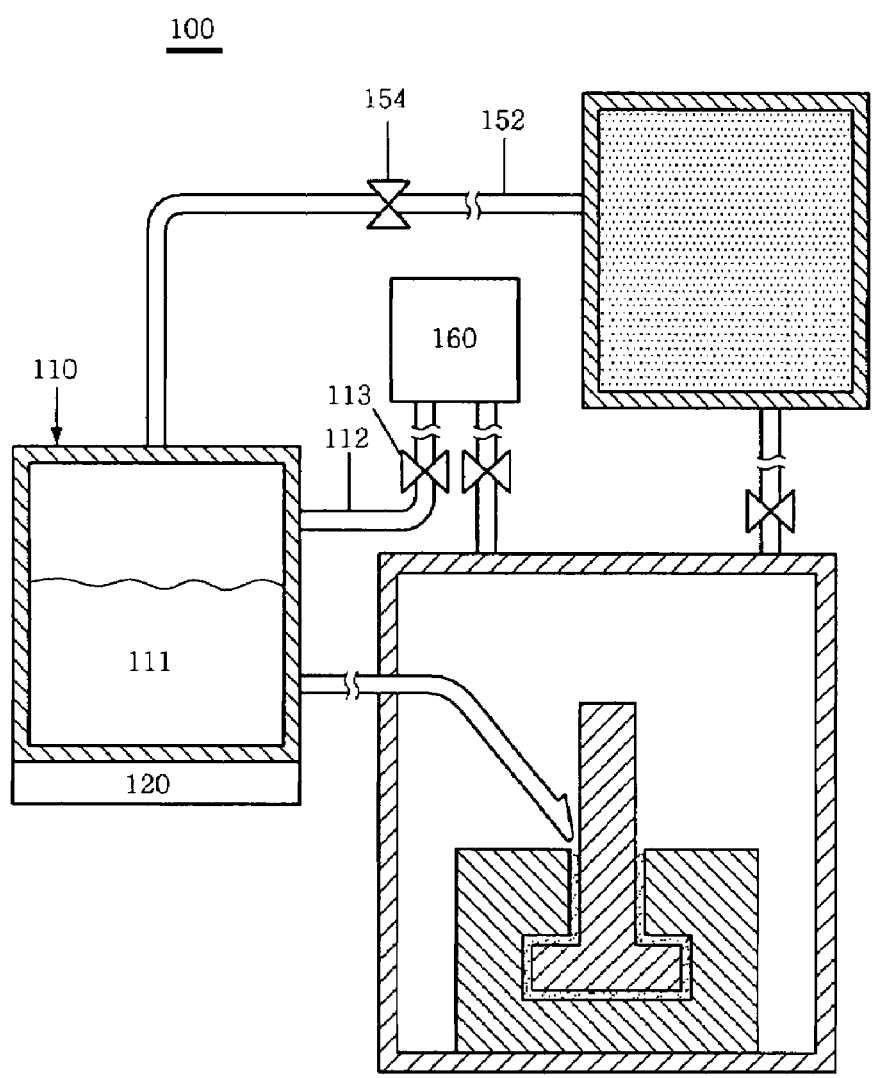
FIGS. 3A through 3E are schematic views illustrating the method for filling the hydrodynamic bearing with fluid according to the flowchart of FIG. 2.

First, at step S110, as shown in FIG. 3A, fluid 111 is supplied into the fluid storage tank 110 through the fluid inlet port (not shown) in the state in which both the throttle valve 113 mounted on the air exhaust pipe 112 and the throttle valve 154 mounted on the nitrogen supply pipe 152 are closed.

Thereafter, the ultrasonic generator 120 is operated to remove air bubbles from the fluid 111 and, at the same time, the throttle valve 113 is opened and the pump 160 is operated to exhaust air from the fluid storage tank 110 to the atmosphere.

Figure 3B:
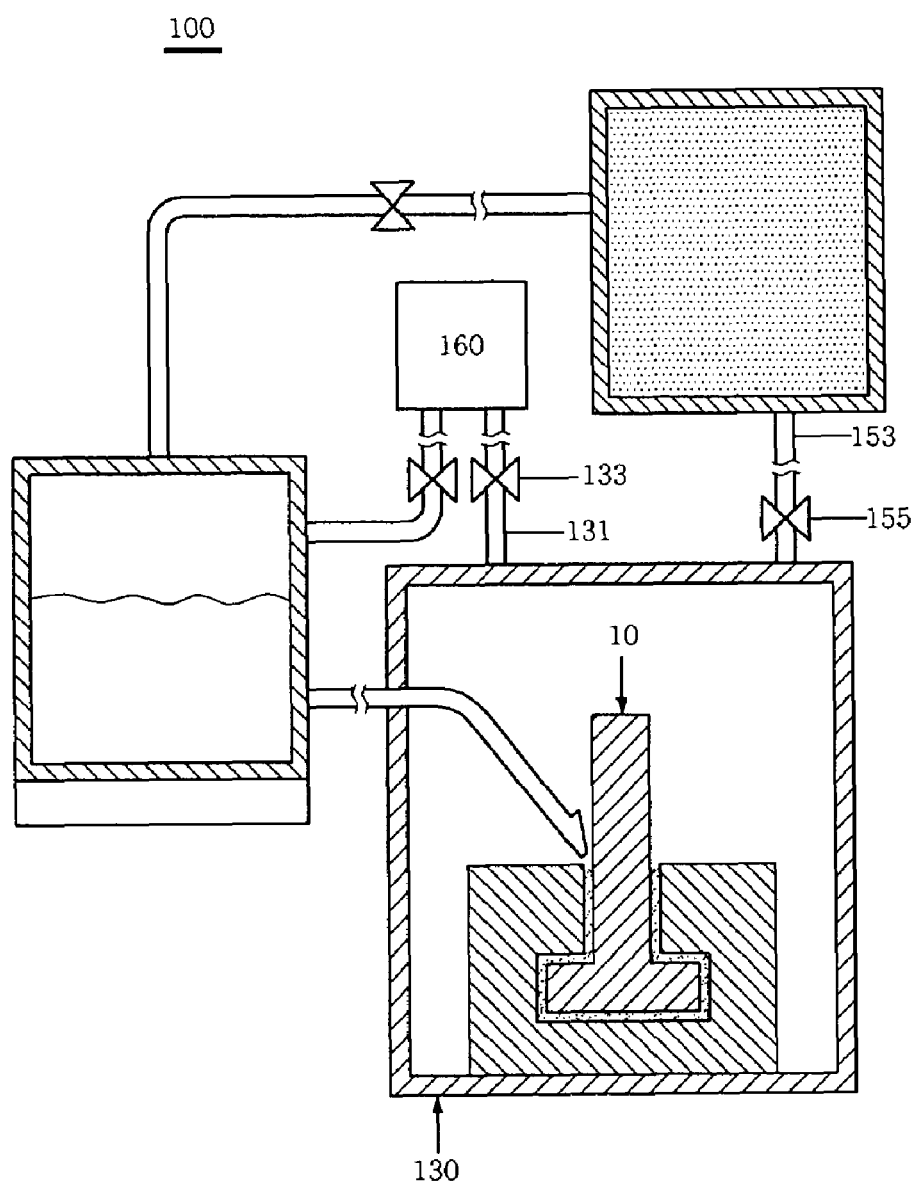

At step S120, as shown in FIG. 3B, the hydrodynamic bearing 10 is placed into the vacuum vessel 130 through the opening (not shown) under the condition that both the throttle valve 133 mounted on the air exhaust pipe 131 and the throttle valve 155 mounted on the nitrogen supply pipe 153 are closed.

Thereafter, the throttle valve 131 is opened and the pump 160 is operated to exhaust air from the vacuum vessel 130 to the atmosphere.

Figure 3C:
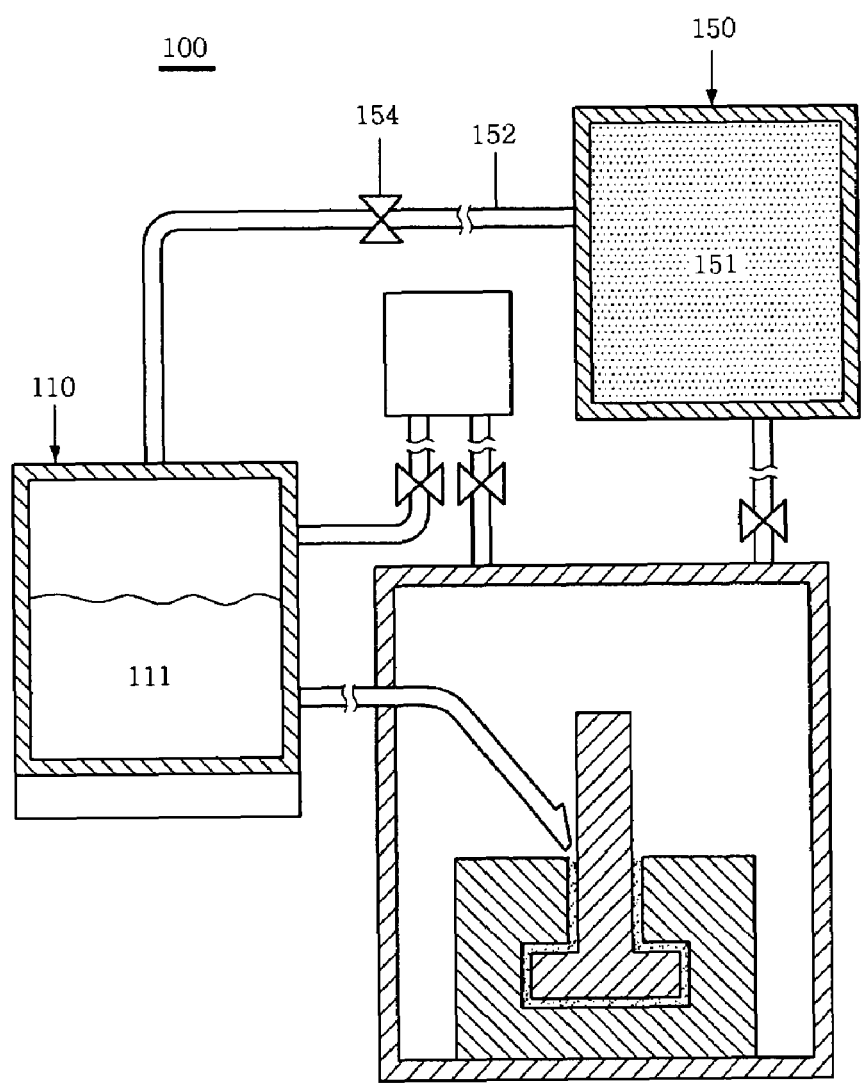

At step S130, as shown in FIG. 3C, the throttle valve 154 mounted on the nitrogen supply pipe 152 of the nitrogen storage tank 150 is opened, thus supplying nitrogen 151 into the fluid storage tank 110 through the nitrogen supply pipe 152.

In the present invention, the fluid storage tank 110 is pressurized using nitrogen so that the pressure difference between the fluid storage tank 110 and the vacuum vessel 130 can be easily controlled. To pressurize the fluid storage tank 110, nitrogen 151, which does not permeate through the fluid 111, is used. Thus, no air bubbles are formed in the fluid 111.

Figure 3D:
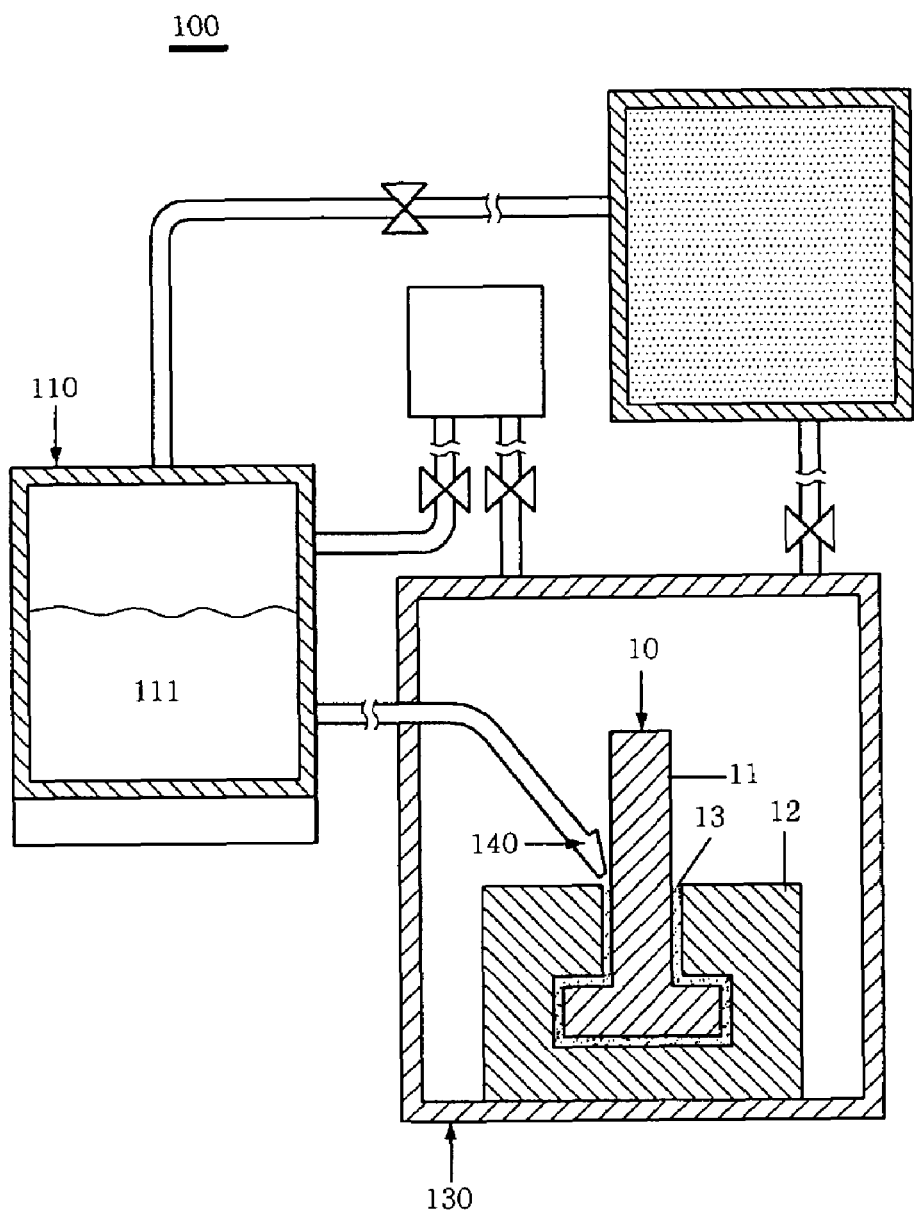

At step S140, as shown in FIG. 3D, fluid is dripped into the micro-gap 13 between the shaft 11 and sleeve 12 of the hydrodynamic bearing 10 using the fluid dispenser 140. In the above state, the dripping of fluid into the micro-gap 13 is executed due to the pressure difference between the fluid storage tank 110 and the vacuum vessel 130.

To cause a predetermined amount of fluid 111 to be evenly dripped into the circular micro-gap 13, the hydrodynamic bearing 10 is rotated. Some of the fluid 111 dripped into the micro-gap 13 permeates through the micro-gap 13 due to capillary action, while the remaining fluid is left in the dripped state without permeating.

Figure 3E:
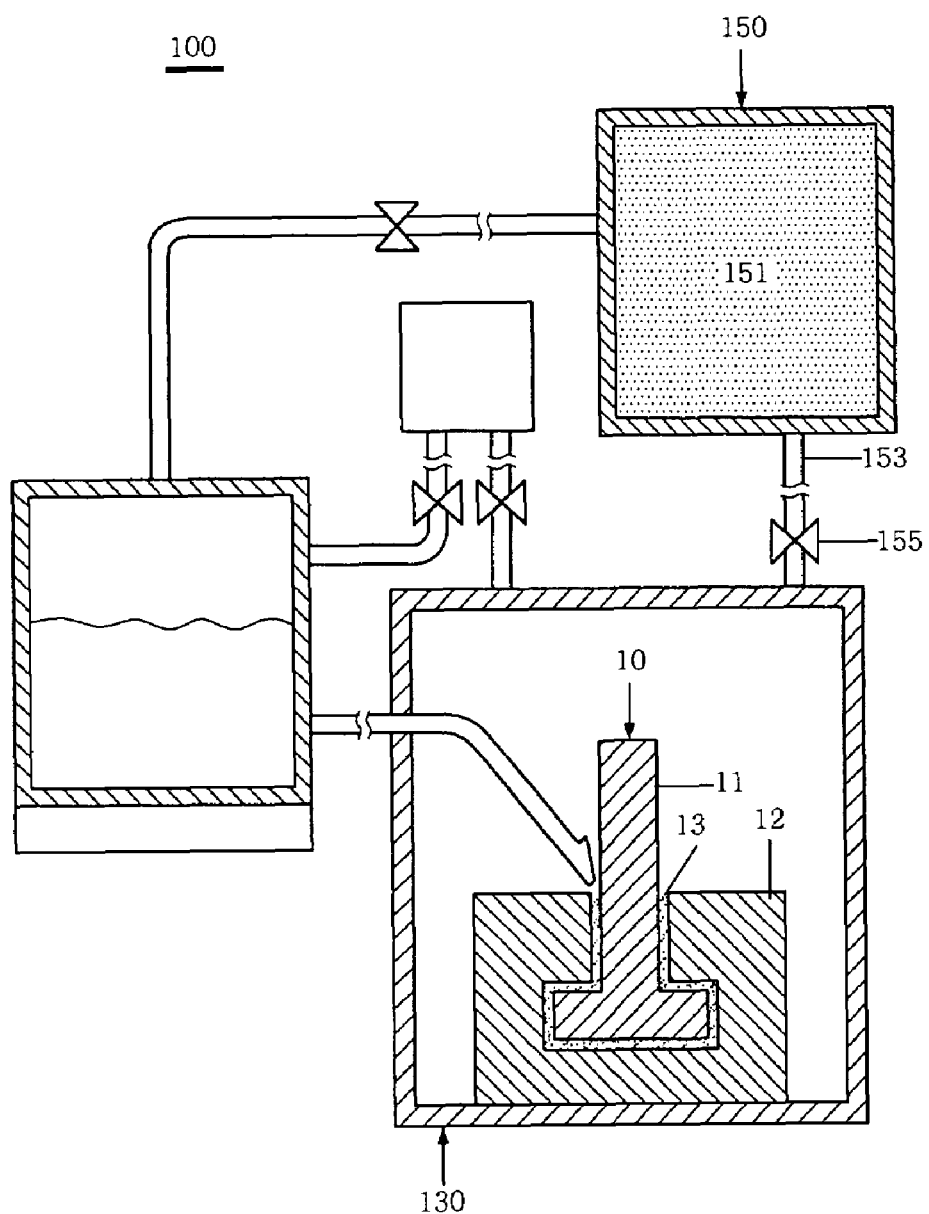
Figure 4:
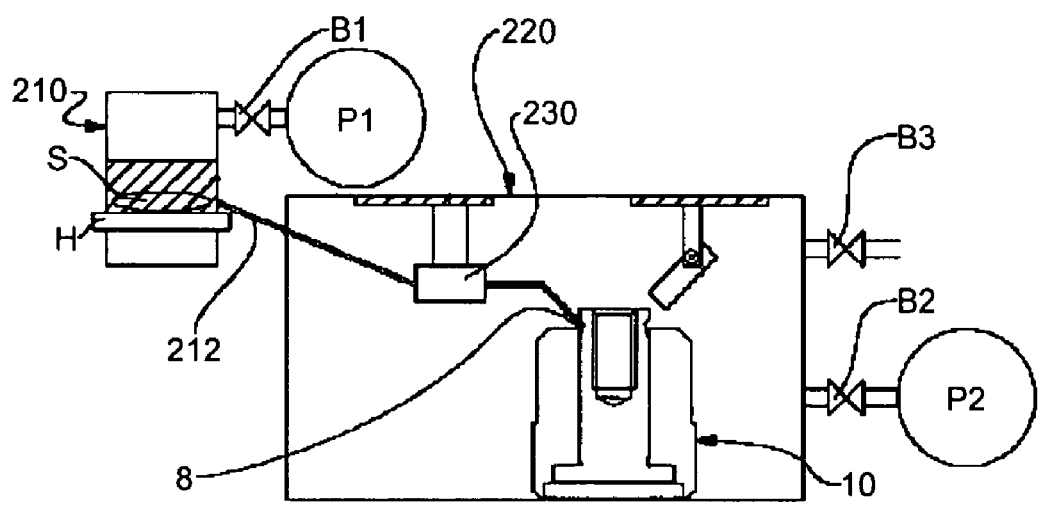
FIG. 4 is a schematic view illustrating a conventional fluid filling system.

Thereafter, at step S150, as shown in FIG. 3E, the throttle valve 155 mounted on the nitrogen supply pipe 153 connected to the nitrogen storage tank 150 is opened so that nitrogen 151 can be supplied to the vacuum vessel 130 through the nitrogen supply pipe 153. In the above state, the fluid 111 charged in the micro-gap 13 is pressurized to cause the entire micro-gap 13 to be completely filled with the fluid 111. In the present invention, to pressurize the fluid 111 charged in the micro-gap 13, nitrogen 151, which does not permeate through the fluid 111, is used. Thus, no air bubbles are formed in the fluid 111 charged in the gap 13.

At step S160, the hydrodynamic bearing 10, which has been completely filled with fluid, is taken out of the vacuum vessel 130 using a suitable device (not shown).

As is apparent from the above description, the system and method for filling hydrodynamic bearings with fluid according to the present invention provides advantages in that the fluid storage tank is pressurized using nitrogen such that the pressure in the fluid storage tank becomes higher than that in the vacuum vessel and forces the fluid to flow to the vacuum vessel and drip onto the hydrodynamic bearing in the vacuum vessel. Thus, the present invention enables the pressure difference between the fluid storage tank and the vacuum vessel to be easily controlled.

Furthermore, unlike the conventional technique, the fluid filling system and method of the present invention uses an ultrasonic generator which is capable of vibrating and heating the fluid to remove air bubbles from the fluid, and thus the present invention simplifies the construction of the system and makes the fluid filling process easy.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for filling hydrodynamic bearings with fluid, comprising:
   means for storing filling material therein;
   means for receiving therein an object to be filled with the filling material, the receiving means being connected to the storing means to allow the filling material to move;
   means for separately exhausting air from both the storing means and the receiving means to an outside; and
   means for separately controlling pressure in both the storing means and the receiving means,
   wherein the storing means is pressurized such that pressure in the storing means becomes higher than pressure in the receiving means, thus causing the filling material to move to the object received in the receiving means and to drip into the object.

2. The system for filling hydrodynamic bearings with fluid according to claim 1, wherein the pressure controlling means supplies nitrogen into both the storing means and the receiving means, thus controlling pressure in both the storing means and the receiving means.

3. The system for filling hydrodynamic bearings with fluid according to claim 2, further comprising:
   means for applying vibrations to the storing means, thus removing air bubbles from the filling material.

4. A system for filling hydrodynamic bearings with fluid, comprising:
   a fluid storage tank for storing fluid therein;
   a vacuum vessel for receiving a hydrodynamic bearing therein;
   a fluid dispenser for connecting the fluid storage tank to the vacuum vessel and dripping the fluid into a micro-gap of the hydrodynamic bearing;
   a pump connected both to the fluid storage tank and to the vacuum vessel and separately exhausting air from both the fluid storage tank and the vacuum vessel to an outside; and
   a nitrogen storage tank for separately controlling pressure in both the fluid storage tank and the vacuum vessel,
   wherein the fluid storage tank is pressurized using nitrogen such that the pressure in the fluid storage tank becomes higher than the pressure in the vacuum vessel, thus causing the fluid to move to the vacuum vessel and to drip into the hydrodynamic bearing received in the vacuum vessel.

5. The system for filling hydrodynamic bearings with fluid according to claim 4, wherein the nitrogen storage tank is connected to both the fluid storage tank and the vacuum vessel through respective nitrogen supply pipes, with a throttle valve provided on each of the nitrogen supply pipes to open or close the nitrogen supply pipe.

6. The system for filling hydrodynamic bearings with fluid according to claim 4, wherein the fluid dripped into the hydrodynamic bearing is pressurized by the nitrogen supplied from the nitrogen storage tank and is charged in the micro-gap of the hydrodynamic bearing.

7. The system for filling hydrodynamic bearings with fluid according to claim 4, further comprising:
   an ultrasonic generator for applying ultrasonic waves to the fluid storage tank, thus removing air bubbles from the fluid.

8. The system for filling hydrodynamic bearings with fluid according to claim 7, wherein the nitrogen storage tank is connected to both the fluid storage tank and the vacuum vessel through respective nitrogen supply pipes, with a throttle valve provided on each of the nitrogen supply pipes to open or close the nitrogen supply pipe.

9. The system for filling hydrodynamic bearings with fluid according to claim 7, wherein the fluid dripped into the hydrodynamic bearing is pressurized by the nitrogen supplied from the nitrogen storage tank and is charged in the micro-gap of the hydrodynamic bearing.

10. The system for filling hydrodynamic bearings with fluid according to claim 4, wherein the pump is connected to both the fluid storage tank and the vacuum vessel through respective air exhaust pipes, with a throttle valve provided on each of the air exhaust pipes to open or close the air exhaust pipe.

11. The system for filling hydrodynamic bearings with fluid according to claim 10, wherein the nitrogen storage tank is connected to both the fluid storage tank and the vacuum vessel through respective nitrogen supply pipes, with a throttle valve provided on each of the nitrogen supply pipes to open or close the nitrogen supply pipe.

12. The system for filling hydrodynamic bearings with fluid according to claim 10, wherein the fluid dripped into the hydrodynamic bearing is pressurized by the nitrogen supplied from the nitrogen storage tank and is charged in the micro-gap of the hydrodynamic bearing.

13. A method for filling hydrodynamic bearings with fluid, comprising the steps of:
   (A) exhausting air from a fluid storage tank using a pump;
   (B) putting a hydrodynamic bearing into a vacuum vessel and exhausting air from the vacuum vessel using the pump;
   (C) supplying nitrogen into the fluid storage tank such that the pressure in the fluid storage tank becomes higher than the pressure in the vacuum vessel;
   (D) moving the fluid from the fluid storage tank to the hydrodynamic bearing using the high pressure in the fluid storage tank and dripping the fluid onto the hydrodynamic bearing; and
   (E) supplying nitrogen into the vacuum vessel, thus pressurizing the dripped fluid and filling the hydrodynamic bearing with the fluid.

14. The method for filling hydrodynamic bearings with fluid according to claim 13, wherein the fluid is vibrated when the air is exhausted at the step (A), so that air bubbles are exhausted from the fluid.

15. The method for filling hydrodynamic bearings with fluid according to claim 14, wherein part of the fluid which has been dripped onto the hydrodynamic bearing at the step (D) permeates through a micro-gap of the hydrodynamic bearing due to capillary action, while a remaining part of the dripped fluid permeates through the micro-gap when the fluid is pressurized by the nitrogen at the step (E).

* * * * *